Jan. 1, 1952     A. F. DE LA CALLE     2,581,175
SUGAR CANE DIFFUSING APPARATUS
Filed Feb. 4, 1950     2 SHEETS—SHEET 1
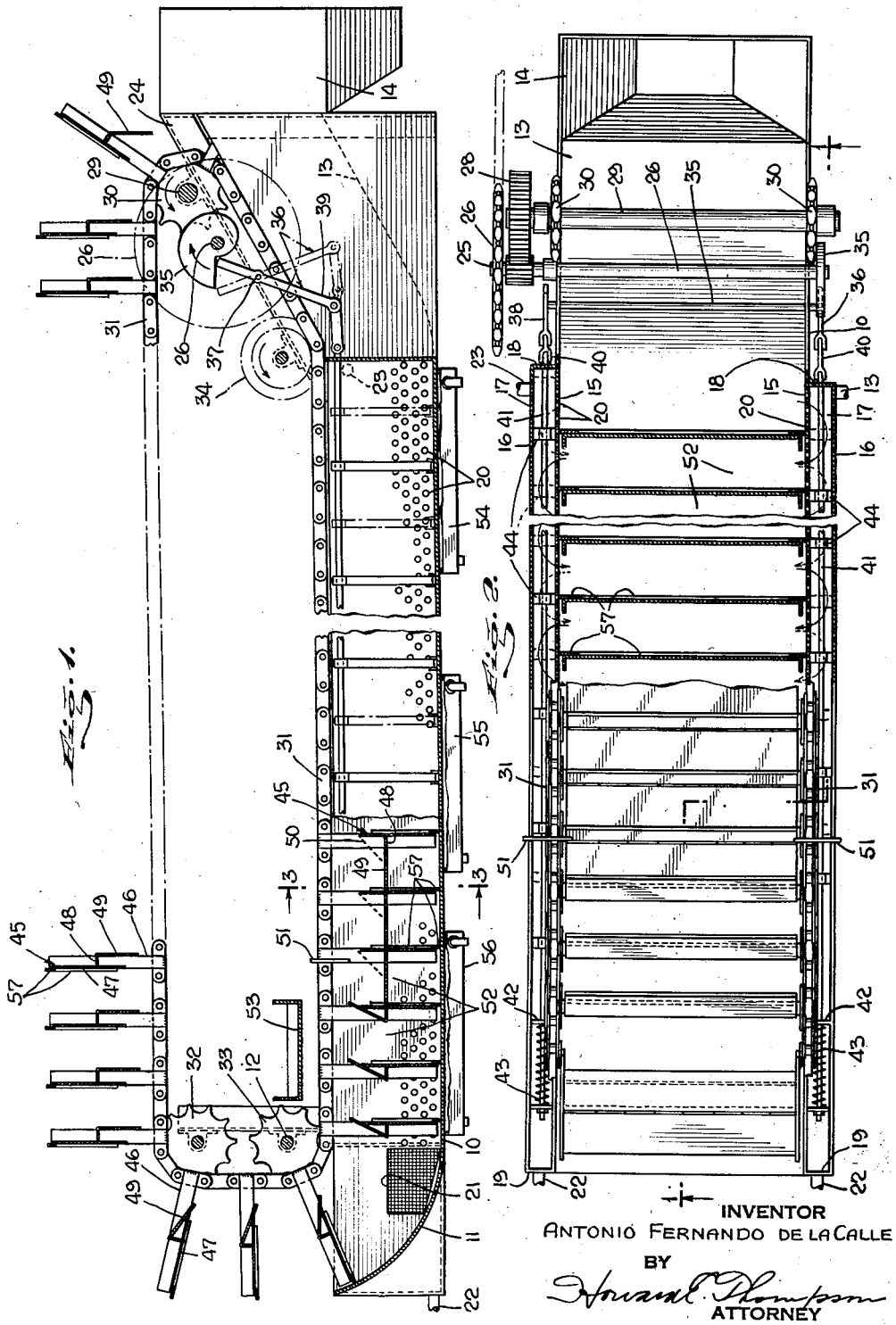
INVENTOR
ANTONIO FERNANDO DE LA CALLE
BY
*Howard Thompson*
ATTORNEY

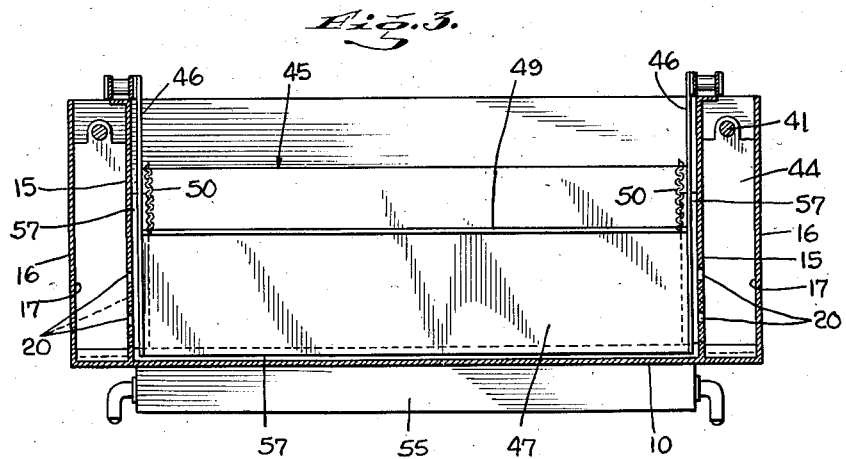
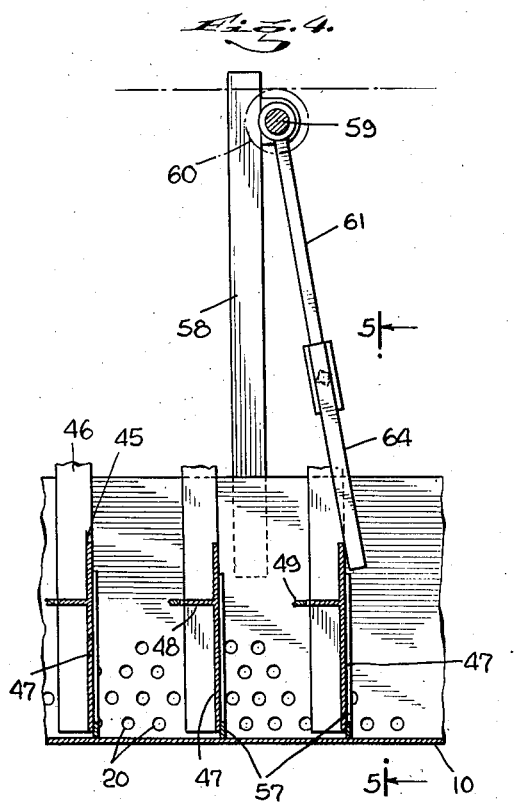
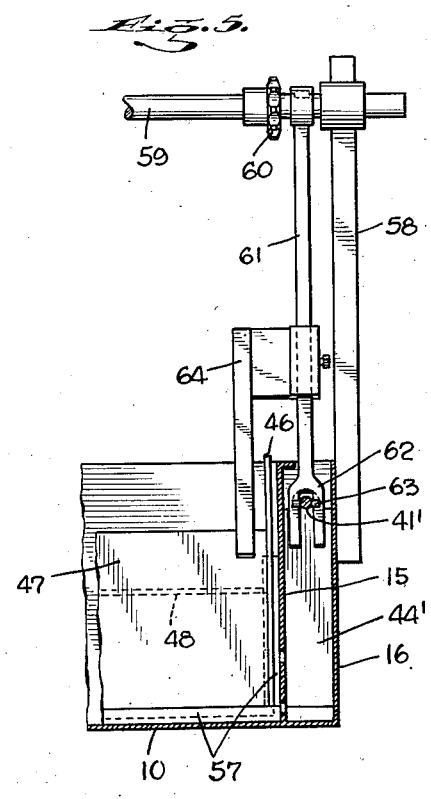

Patented Jan. 1, 1952

2,581,175

UNITED STATES PATENT OFFICE 2,581,175

SUGAR CANE DIFFUSING APPARATUS

Antonio Fernando de la Calle, Mexico City, Mexico, assignor to Delta Investment, Inc., Habana, Cuba, a corporation of the Republic of Panama Application February 4, 1950, Serial No. 142,480
In Mexico February 15, 1949

12 Claims. (Cl. 127—5)

This invention relates to apparatus for use in extracting sugar from sugar cane by what is known as a "diffusing" process, that is to say, by passage of cane chips slowly through an elongated trough or tank, while circulating hot water counterwise through a plurality of chambers or compartments in which the chips are maintained so as to expedite the removal of sugar from the cane chips. More particularly, the invention deals with apparatus of the type defined having means for intermittently changing the direction of flow of water through the compartments to break-up and distribute the chips to effectively insure displacement of substantially all of the sugar content of the chips.

The novel features of the invention will be best understood from the following description, when taken together with the accompanying drawings, in which certain embodiments of the invention are disclosed and, in which, the separate parts are designated by suitable reference characters in each of the views and, in which:

Fig. 1 is a broken sectional view with part of the construction broken away, the section being substantially on the line 1—1 of Fig. 2.

Fig. 2 is a plan and sectional view of the structure shown in Fig. 1 with parts broken away and omitted.

Fig. 3 is an enlarged cross-section on the line 3—3 of Fig. 1.

Fig. 4 is an enlarged sectional detail through the central portion of an apparatus, omitting parts of the construction, showing a modified method of controlling the reverse flow of water through the apparatus; and Fig. 5 is a section on the line 5—5 of Fig. 4.

In known apparatus of the type and kind under consideration, difficulty has been experienced in freeing or removing all of the sugar from the cells of cane chips by reason of the fact that, in the various flights or compartments of the apparatus, the chips would become packed, thus preventing the circulated water from coming in contact with all of the cane chips and apparatus of this kind have required the use of large quantities of water in an effort to accomplish the desired result.

It also frequently happens that a mass of interlocked cane shreds build-up a kind of continuous cushion which tends to float, especially in that part of the apparatus containing high density juice, thus leaving a free space below such cushion through which the water flows freely rather than forcing its way through the mass of overhanging cushion, referred to as "bagasse." It will thus be apparent that efficiency of apparatus of this type and kind is far from desirable and relatively poor results are obtained largely due to the greater volume of water in the resulting discharged fluid.

With my improved apparatus, the objectionable characteristics experienced with known apparatus is overcome and substantially a total extraction of sugar from the cane is obtained with the use of a minimum amount of diffusing water. These results are accomplished by dragging the cane chips along the trough between a plurality of spaced vertically arranged flights or partition members actuated through the medium of an endless chain and the compartments formed between the flights and partitions include movable cover members which are automatically moved into position to hold the chips down in the compartments in the circulation of hot water through such compartments. Still further, means is provided to definitely control and regulate the path of movement of the hot water through the respective compartments in a transverse zig-zag path and in reversing the flow through the compartments to break-up or agitate the chips, thus producing a very effective method of extracting or removing the sugar from the cane chips.

In the accompanying drawing, 10 represents an elongated tank or trough having an upwardly curved inlet end 11 of a radius having a shaft 12 as its axis. The other end of the tank has an upwardly inclined wall portion, indicated in dotted lines at 13 at the right end of Fig. 1 which wall portion opens into a discharge hopper 14, into which the waste cane chips are discharged for delivery into a receptacle or onto a dispensing conveyor, not shown.

The elongated trough-like tank has doubled wall sides for a greater portion of their length, the inner walls being designated by the reference character 15, and the outer walls by the reference character 16. This doubled wall construction forms two circulating chambers 17 at the sides of the trough, the chambers having closed end walls as at 18 and 19, note Fig. 2. The inner walls 15, within the boundaries of the end walls 18 and 19, have circulating apertures, parts only of which are indicated at 20 in the respective views.

The walls 15, at the inlet end of the tank or trough, have large screened openings 21 for passage of the circulated fluid into the chambers 17, said chambers having discharge pipes 22 at said ends for discharge of the syrup into suitable receptacles, not shown. Admission of the hot water into the chambers 17 is accomplished through inlet pipes 23. At this time, it might be well to state that a water level is maintained in the trough at a point above the top wall members of the respective compartments of the apparatus which are later described and any suitable means can be provided for maintaining such level. It will also be apparent that the trough or tank 10 is arranged at an inclination so as to provide a constant flow in the direction of the discharge pipes 22 which is diagrammatically illustrated by the arrangement of the tank on the drawing. The tank will have suitable supports which are not shown.

At the discharge end of the tank or trough and suitably supported on the raised portion 24 thereof is a drive shaft 25 driven from a motor or other drive, not shown, for example, by a chain drive passing over a sprocket 26 on the shaft 25.

On the shaft 25 is a pinion 27 meshing with a gear 28 on a supplemental shaft 29 and on this shaft are fixed two drive sprockets 30 for driving endless chains 31 disposed at opposite sides of the tank or trough. The chain also passes around idler sprockets 32, 33 and 34 which control the path of movement of the chains and, if desired, additional idler sprockets can be included. The sprockets 33 are arranged on the shaft or axis 12, as will be apparent.

In the construction shown in Figs. 1 and 2 of the drawing, a cam 35 is fixed to one end of the shaft 26 and this cam controls operation of a lever 36 mounted on a cross-rod 37. The other end of the rod has an arm 38 similar to the lower end 39 of the lever 36.

Pivoted to the lower end 39 of the lever 36 and the corresponding end of the arm 38 are links 40 which are pivoted to rods 41 slidable through the end walls 18 and also having bearing mountings in partition walls 42 adjacent the delivery end of the apparatus. Adjustably mounted on the rods 41 outwardly of the partitions 42 are springs 43 tensioned to maintain the lever 36 in constant engagement with the cam 35, thus facilitating movement of the lever into the full and dotted position shown in Fig. 1.

Secured to the rods 41, in each of the chambers 17 at spaced intervals, are valves or baffle plates 44, these valves having about their peripheral edges suitable packings to seal the same in the compartments 17, while at the same time facilitating back and forth sliding movement therein.

Coupled with spaced links of opposed chains 31 are flights or compartment-forming plates 45 which may also be regarded as feeder blades. Part of these blades are indicated along different portions of the chains in Fig. 1 of the drawing and part are also seen in Fig. 2. Each flight or feeder blade comprises side strips 46 welded or otherwise secured to the links, these strips having the transverse plate members 47 welded or otherwise secured thereto and substantially centrally of the plates 47 are angularly disposed horizontal flange portions 48, to the outer edges of which are hinged lids or cover plates 49. These cover plates have a free chain connection, as at 50, with the plates 47, note Fig. 3, so that they may drop into horizontal position and be supported in the horizontal position as seen in Fig. 1 of the drawing adjacent the section line 3—3. However, to the left of the section line 3—3 and adjacent the delivery end of the apparatus inwardly extending fingers 51 are provided which extend into the path of the covers 49 so that, in passing the tripper fingers 51, the covers will be dropped into the lowered horizontal position from the raised position illustrated at the left of the trips 51, as seen in Fig. 1. In other words, as the flights or feeder blades pass along the upper portion of the chain, the cover plates 49 are arranged vertically or, in other words, parallel to the plates 47, then as the blades or plates pass over the idlers 42, 43, the plates 49 drop onto the upper edges of the plates 47, as seen at the left of Fig. 1, and maintain this position until they are tripped by the fingers 51 to move into the horizontal positions. This takes place immediately after the shredded or chipped sugar cane has been fed into the respective compartments 52 between the feeder blades by any suitable delivery means such for example as an endless conveyor delivery, diagrammatically seen at 53 in Fig. 1.

The covers 49 serve to move the sugar cane chips or cuttings down in the compartments 52 and to maintain them in the lower portions of the compartments at all times. It will also be understood that, as the flights or feeder blades deliver the waste cane chips into the hopper 14, the covers 49 swing downwardly, as partially seen at the right of Fig. 1 of the drawing.

The spacing of the baffles or valves 44 one with respect to the other on each of the rods 41 is equal to the distance between alternate flights or feeder blades and the arrangement of the valves or baffles 44 on one rod 41 is intermediate those of the other rod, as will clearly appear from a consideration of Fig. 2. It will thus be apparent that, when the lever 36 is in the full line position of Fig. 1 and the corresponding position of Fig. 2, water will be circulated across each of the compartments 52 in the direction illustrated by the full line arrows of Fig. 2; whereas, when the valves 44 are moved into the dotted position, the water will be circulated in the reverse direction through the respective compartments or as indicated by the dotted line arrows in Fig. 2. This method of circulation results in breaking-up or agitating the mass so as to produce the most efficient results in displacing or removing the sugar from the cane and producing a resulting syrup having a high sugar content and waste cuttings or bagasse from which substantially all of the sugar has been removed.

Spaced longitudinally of and beneath the tank or trough 10 are a series of heaters, as for example, 54, 55 and 56, only a part of which is shown. For example, these heaters may comprise steam, hot water or other type of heating mediums and may have different temperatures so as to provide different temperature conditions longitudinally of the trough.

It will also be apparent that the flights or feeder blades 47 have, at their peripheral edges, suitable packing strips, as at 57, to seal the same in their movement through the tank, so that a flow of water and/or syrup, is conducted and maintained in the paths controlled by said baffles or valves 44.

It will, of course, be understood that the flights or feeder blades are constantly moving through the trough from left to right and during this constant movement the baffles or valves 44 are intermittently moved during each cycle of rotation of the shaft 26 back and forth to produce a reversed flow of the fluid across the tanks. In this circulation, the fluid passes through the apertures 20 of the walls 15 and into the chambers 17. By reason of this construction, a highly efficient method is provided for displacing the sugar from the cane and one which will operate on a principle of utilizing a minimum amount of water in the complete processing.

In Figs. 4 and 5 of the drawing, I have shown a slight modification in the method of actuating the valves. In these figures, the general structure of the apparatus is the same as that shown in Fig. 1, part of the tank or trough 10 being shown and, in Fig. 1, a few of the flights or feeder blades 47 are shown, parts of the covers 49 being illustrated. Extending upwardly from the sides of the tank or trough at any desired position between the idlers 33 and 34 and preferably adjacent the idler 34 are risers 58, supporting at their upper ends a cross-shaft or rod 59, on which freely rotatable idler sprockets 60 may be arranged as supports and guides for the upper portions of the chains 31.

On the rod or shaft 59 are downwardly extending arms 61 having lower forked ends 62, one of which is seen in Fig. 5 of the drawing. The forked end 62 spans a rod 41', similar to the rod 41, and engages a cross-pin 63, secured to the rod. Baffles or valves 44', similar to the baffles or valves 44, are secured to the rod 41' and, while only one side of the apparatus is indicated in Fig. 5, it will be apparent that the other side is of similar construction. Adjustably secured on the arm 61 is an operating finger 64 vertically adjustable so as to control the moment of release in imparting intermittent movement to the baffles or valves 44'.

Considering Fig. 4 of the drawing, it will appear that the finger 64 extends into the trough to a position to be engaged by the respective plates 47, thus as the plates 47 move to the right, the arms 61 are correspondingly moved to the right, feeding the valves 44' in this direction in such movement, the latter action being governed by the tension of springs controlling operation of the rods 41', in other words, springs similar to the springs 43. Then, when the plate 47 has moved sufficiently to free the finger 64, the springs controlling the valves 44' will operate to suddenly move the valves to the left until the finger 64 strikes the next adjacent plate 47. In this way, a control is provided for reverse flow of the fluid through the respective compartments.

The showing in the accompanying drawings is, to some degree, diagrammatic from the standpoint that details of construction of the various parts are not specifically shown, but it will be quite apparent to anyone skilled in the art just how the complete apparatus operates from the illustration when taken in connection with the accompanying specification.

Having fully described my invention, what I claim as new and desire to secure by Letters Patent is:

1. An apparatus of the character described, comprising an elongated trough, having side walls, means for delivering cane chips to one end of the trough, an endless drive, means at one end of the trough for operating said drive, said drive having spaced members forming spaced partitions longitudinally of the trough in movement of the drive therethrough, said partitions being adapted to move chips longitudinally of said trough, the trough having circulating chambers outwardly of said walls throughout the greater portion of their length, means comprising apertures in the lower portion of said side walls for placing moving separate compartments between said partitions in communication with said chambers, intercoupled valve members spaced longitudinally of each of said chambers controlling flow through said chambers and said compartments, said endless drive being actuated to slowly feed the partitions thereof longitudinally of the trough, means in operative engagement with said drive operating means and said valve members for intermittently shifting the position of the valve members in said circulating chambers for changing direction of fluid flow through the compartments, means admitting fluid at one end of said chambers, and means for discharging fluid from the other end thereof 2. An apparatus of the character described, comprising an elongated trough having side walls, means for delivering cane chips to one end of the trough, an endless drive, means at one end of the trough for operating said drive, said drive having spaced members forming spaced partitions longitudinally of the trough in movement of the drive therethrough, said partitions being adapted to move chips longitudinally of said trough, the trough having circulating chambers outwardly of said side walls throughout the greater portion of their length, means comprising apertures in the lower portion of said side walls for placing moving separate compartments between said partitions in communication with said chambers, intercoupled valve members spaced longitudinally of each of said chambers controlling flow through said chambers and said compartments, said endless drive being actuated to slowly feed the partitions thereof longitudinally of the trough, means in operative engagement with said drive operating means and said valve members for intermittently shifting the position of the valve members in said circulating chambers for changing direction of fluid flow through the compartments, means admitting fluid at one end of said chambers, means for discharging fluid from the other end thereof, said partitions including upper cover portions movably supported thereon and normally maintained in raised position for delivery of cane chips into compartments between said partitions, means for automatically moving the covers into lowered position, and means for maintaining the covers in predetermined lowered position.

3. An apparatus of the class described, comprising an elongated trough having side walls, a pair of endless chains supported above the trough, means for driving said chains, means spaced longitudinally of the chains for movably supporting partition walls movable through the power portions of the trough by said chains from a feeder end to a discharge end of the trough, said partition walls forming therebetween and within said side walls compartments movable through the trough, means at the feeder end of the trough for delivering material to be processed into said moving compartments, means forming circulating chambers outwardly and longitudinally of the side walls of the trough, a movable valve unit in each circulating chamber, each unit having a series of valves the valves of one unit being disposed intermediate those of the other unit, means for simultaneously moving both of said valve units, lower portions of the side walls of the trough having passages communicating with said circulating chambers for circulation of a fluid transversely through the moving compartments in zig-zag fashion, and intermittent operation of said valve units intermittently reversing the flow of fluid through the separate compartments.

4. In apparatus of the class described, comprising an elongated trough having side walls, a pair of endless chains supported above the trough, means for driving said chains, means spaced longitudinally of the chains for movably supporting partition walls movable through the lower portions of the trough by said chains from a feeder end to a discharge end of the trough, said partition walls forming therebetween and within said side walls compartments movable through the trough, means at the feeder end of the trough for delivering material to be processed into said moving compartments, means forming circulating chambers outwardly and longitudinally of the side walls of the trough, a movable valve unit in each circulating chamber, each unit having a series of valves the valves of one unit being disposed intermediate those of the other unit, means for simultaneously moving both of said valve units, lower portions of the side walls of the trough having passages communicating with said circulating chambers for circulation of a fluid transversely through the moving compartments in zig-zag fashion, intermittent operation of said valve units intermittently reversing the flow of fluid through the separate compartments, said circulating chambers having fluid inlets at one end and outlets at the opposed end, and cover means movably supported on said partitions for maintaining material introduced into each of said compartments at the lower portion of the compartments.

5. In apparatus of the class described, comprising an elongated trough having side walls, a pair of endless chains supported above the trough, means for driving said chains, means spaced longitudinally of the chains for movably supporting partition walls movable through the lower portions of the trough by said chains from a feeder end to a discharge end of the trough, said partition walls forming therebetween and within said side walls compartments movable through the trough, means at the feeder end of the trough for delivering material to be processed into said moving compartments, means forming circulating chambers outwardly and longitudinally on the side walls of the trough, a movable valve unit in each circulating chamber, each unit having a series of valves the valves of one unit being disposed intermediate those of the other unit, means for simultaneously moving both of said valve units, lower portions of the side walls of the trough having passages communicating with said circulating chambers for circulation of a fluid transversely through the moving compartments in zig-zag fashion, intermittently reversing the flow of fluid through the separate compartments, said circulating chambers having fluid inlets at one end and outlets at the opposed end, cover means movably supported on said partitions for maintaining material introduced into each of said compartments at the lower portion of the compartments, and the valves of said valve units and said partitions each having means effecting a seal to definitely control fluid flow through the apparatus.

6. In apparatus of the class described, comprising an elongated trough having side walls, a pair of endless chains supported above the trough, means for driving said chains, means spaced longitudinally of the chains for movably supporting partition walls movable through the lower portions of the trough by said chains from a feeder end to a discharge end of the trough, said partition walls forming therebetween and within said side walls compartments movable through the trough, means at the feeder end of the trough for delivering material to be processed into said moving compartments, means forming circulating chambers outwardly and longitudinally of the side walls of the trough, a movable valve unit in each circulating chamber, each unit having a series of valves the valves of one unit being disposed intermediate those of the other unit, means for simultaneously moving both of said valve units, lower portions of the side walls of the trough having passages communicating with said circulating chambers for circulation of a fluid transversely through the moving compartments in zig-zag fashion, intermittent operation of said valve units intermittently reversing the flow of fluid through the separate compartments, said circulating chambers having fluid inlets at one end and outlets at the opposed end, cover means movably supported on said partitions for maintaining material introduced into each of said compartments at the lower portion of the compartments, said last named means being normally open at the feeder end of the apparatus, and means adjacent said end for automatically moving said cover means into operative position.

7. An apparatus of the class described, comprising an elongated trough having side walls, a pair of endless chains supported above the trough, means for driving said chains, means spaced longitudinally of the chains for movably supporting partition walls movable through the lower portions of the trough by said chains from a feeder end to a discharge end of the trough, said partition walls forming therebetween and within said side walls compartments movable through the trough, means at the feeder end of the trough for delivering material to be processed into said moving compartments, means forming circulating chambers outwardly and longitudinally of the side walls of the trough, a movable valve unit in each circulating chamber, each unit having a series of valves the valves of one unit being disposed intermediate those of the other unit, means for simultaneously moving both of said valve units, lower portions of the side walls of the trough having passages communicating with said circulating chambers for circulation of a fluid transversely through the moving compartments in zig-zag fashion, intermittent operation of said valve units intermittently reversing the flow of fluid through the separate compartments, and tensional means for moving said valve units in one direction.

8. In apparatus for removing sugar from sugar cane, an elongated trough having side walls, means for delivering cane chips into one end of the trough, means for feeding said chips longitudinally through and confining the same in the lower portion of the trough within said side walls and for discharging the chips from the other end of the trough, said chip feeding means forming, within the side walls, a plurality of moving compartments, means for circulating water through the compartments of the trough and around the chips fed through the trough in a transverse zig-zag path througout the major portion of the length of said trough, said water circulating means comprising elongated chambers outwardly of said side walls, intercoupled valves movable in said chambers, the side walls having apertures placing the trough in communication with said chambers and automatically actuated means to intermittently actuate said valves to reverse the direction of zig-zag flow of water through said moving compartments to agitate the cane chips in substantially completely removing all of the sugar therefrom when discharged from the trough.

9. In apparatus for removing sugar from sugar cane, an elongated trough having side walls, means for delivering cane chips into one end of the trough, means for feeding said chips longitudinally through and confining the same in the lower portion of the trough within said side walls and for discharging the chips from the other end of the trough, said chip feeding means forming within the side walls, a plurality of moving compartments, means for circulating water through the compartments of the trough and around the fed through the trough in a transverse zig-zag path throughout the major portion of the length of said trough, said water circulating means comprising elongated chambers outwardly of said side walls, intercoupled valves movable in said chambers, the side walls having apertures placing the trough in communication with said chambers, automatically actuated means to intermittently actuate said valves to reverse the direction of zig-zag flow of water through said moving compartments to agitate the cane chips in substantially completely removing all of the sugar therefrom when discharged from the trough, and means spaced longitudinally of the trough for applying heat to the water and syrup circulated therethrough.

10. In apparatus for removing sugar from sugar cane, an elongated trough having side walls, means for delivering cane chips into one end of the trough, means for feeding said chips longitudinally through and confining the same in the lower portion of the trough within said side walls and for discharging the chips from the other end of the trough, said chip feeding means forming, within the side walls, a plurality of moving compartments, means for circulating water through the compartments of the trough and around the chips fed through the trough in a transverse zig-zag path throughout the major portion of the length of said trough, said water circulating means comprising elongated chambers outwardly of said side walls, intercoupled valves movable in said chambers, the side walls having apertures placing the trough in communication with said chambers, automatically actuated means to intermittently actuate said valves to reverse the direction of zig-zag flow of water through said moving compartments to agitate the cane chips in substantially completely removing all of the sugar therefrom when discharged from the trough, means spaced longitudinally of the trough for applying heat to the water and syrup circulated therethrough, and said last named means comprising independent heating mediums providing different temperature controls.

11. In apparatus for removing sugar from sugar cane, an elongated trough having side walls, means for delivering cane chips into one end of the trough, means for feeding said chips longitudinally through and confining the same in the lower portion of the trough within said side walls and for discharging the chips from the other end of the trough, said chip feeding means forming within the side walls, a plurality of moving compartments, means for circulating water through the compartments of the trough and around the chips fed through the trough in a transverse zig-zag path throughout the major portion of the length of said trough, said water circulating means comprising elongated chambers outwardly of said side walls, intercoupled valves movable in said chambers, the side walls having apertures placing the trough in communication with said chambers, automatically actuated means to intermittently actuate said valves to reverse the direction of zig-zag flow of water through said moving compartments to agitate the cane chips in substantially completely removing all of the sugar therefrom when discharged from the trough, means spaced longitudinally of the trough for applying heat to the water and syrup circulated therethrough, said last named means comprising independent heating mediums providing different temperature controls, a hopper at the discharge end of the trough, and the discharge end portion of the trough having an upwardly inclined portion opening into said hopper.

12. An apparatus of the character described, comprising an elongated trough having side walls, means for delivering cane chips to one end of the trough, an endless drive at one end of the trough, means for operating the drive, said drive having spaced members forming spaced partitions longitudinally of the trough, the trough having circulating chambers outwardly of said side walls throughout the greater portion of their length, means comprising apertures in the lower portion of said side walls for placing separate moving compartments between said partitions in communication with said chambers, intercoupled valve members spaced longitudinally of each of said chambers controlling flow through said chambers and said compartments, said endless drive being actuated to slowly feed the partitions thereof longitudinally of the trough, means in operative engagement with said drive operating means and said valve members for intermittently shifting the position of the valve members in said circulating chambers for changing direction of fluid flow through the compartments, means admitting fluid at one end of said chambers, means for discharging fluid from the other end thereof, said partitions including upper cover portions movably supported thereon and normally maintained in raised position for delivery of cane chips into compartments between said partitions, means for automatically moving the covers into lowered position, means for maintaining the covers in predetermined lowered position, the discharge end of the trough having an upwardly inclined portion, over which the processed cane chips are adapted to be moved by said partitions, and a discharge hopper at the end of said inclined portion, into which the chips are adapted to be moved.

ANTONIO FERNANDO DE LA CALLE.

REFERENCES CITED

The following references are of record in the file of this patent:

FOREIGN PATENTS

| Number | Country | Date |
|---|---|---|
| 381,538 | France | Jan. 14, 1908 |
| 746,320 | France | Mar. 7, 1933 |
| 751,534 | France | June 19, 1933 |
| 780,294 | France | Jan. 29, 1935 |